United States Patent
Wang et al.

(10) Patent No.: US 9,047,831 B2
(45) Date of Patent: Jun. 2, 2015

(54) LIQUID CRYSTAL DISPLAY PANEL AND DISPLAY DRIVING METHOD

(71) Applicants: AU Optronics (Suzhou) Corp., Ltd., Suzhou (CN); AU Optronics Corporation, Hsin-Chu (TW)

(72) Inventors: Xiao-Lin Wang, Suzhou (CN); Jun Zhang, Suzhou (CN)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 188 days.

(21) Appl. No.: 13/781,884

(22) Filed: Mar. 1, 2013

(65) Prior Publication Data

US 2013/0257701 A1    Oct. 3, 2013

(30) Foreign Application Priority Data

Apr. 1, 2012   (CN) .......................... 2012 1 0099644

(51) Int. Cl.
G09G 3/36      (2006.01)
G02F 1/133     (2006.01)

(52) U.S. Cl.
CPC .............. G09G 3/36 (2013.01); G02F 1/13306 (2013.01); *G09G 3/3614* (2013.01); G09G 3/3655 (2013.01)

(58) Field of Classification Search
CPC ..... G02F 1/13306; G09G 3/36; G09G 3/3655
USPC ........................................ 345/87, 90, 92, 211
See application file for complete search history.

(56) References Cited

U.S. PATENT DOCUMENTS

| | | | |
|---|---|---|---|
| 8,339,348 B2 | 12/2012 | Chan et al. | |
| 2004/0056832 A1* | 3/2004 | Abe | 345/90 |
| 2008/0136764 A1* | 6/2008 | Kim et al. | 345/92 |
| 2010/0321365 A1* | 12/2010 | Fanchiang et al. | 345/211 |

FOREIGN PATENT DOCUMENTS

| | | |
|---|---|---|
| CN | 101197121 A | 6/2008 |
| CN | 100445855 C | 12/2008 |
| CN | 100561563 C | 11/2009 |

* cited by examiner

*Primary Examiner* — Kumar Patel
*Assistant Examiner* — Kuo Woo
(74) *Attorney, Agent, or Firm* — WPAT, PC; Justin King

(57) ABSTRACT

A liquid crystal display panel and a display driving method are disclosed. The liquid crystal display panel includes data lines, scan lines, common electrode lines, pixel units, voltage buffer circuits and common electrode controller units. The pixel units are coupled to corresponding data lines and scan lines. Each pixel unit includes a storage capacitor. The pixel units on the same row are coupled to the same common electrode line. The common electrode controller units drive the common electrode lines to re-charge each pixel unit via the storage capacitor. The voltage buffer circuits are coupled between the common electrode controller units and the common electrode lines. The voltage buffer circuits are used for maintaining the voltage levels on each of the common electrode lines when each of the pixel units is not in their data writing period.

12 Claims, 11 Drawing Sheets

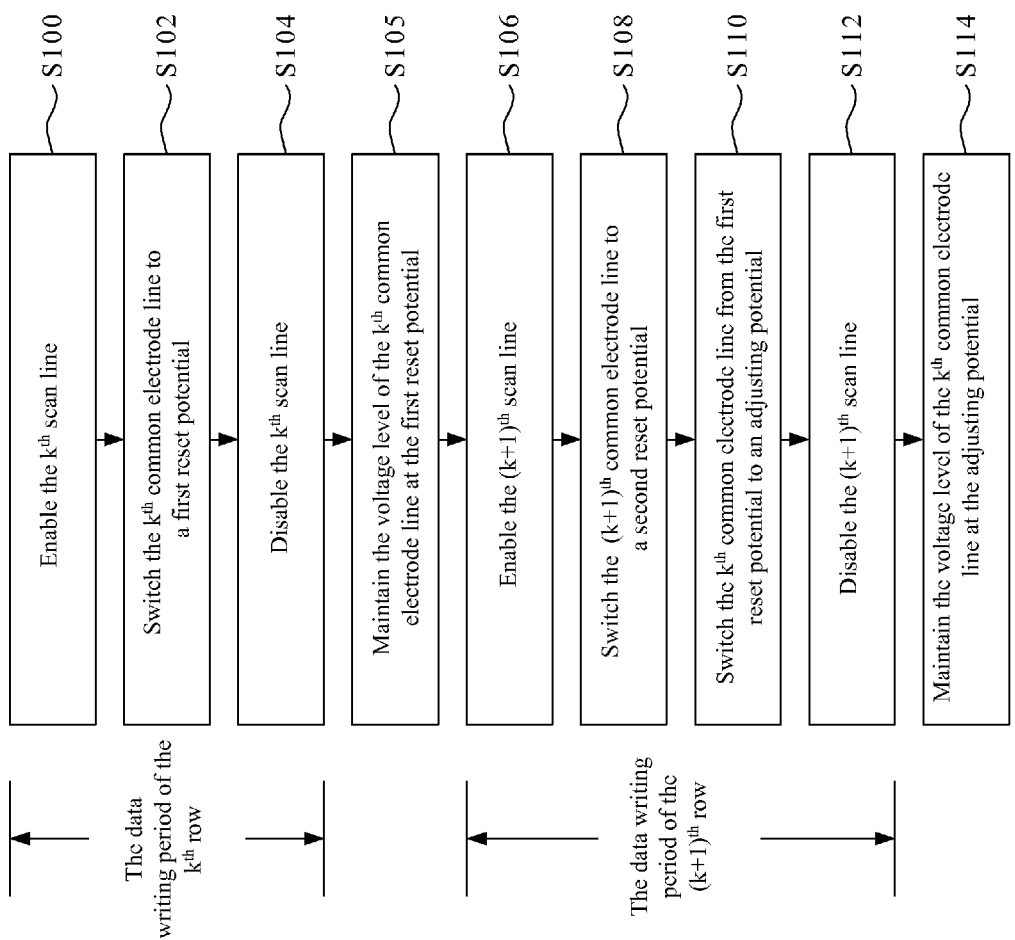

US 9,047,831 B2

LIQUID CRYSTAL DISPLAY PANEL AND DISPLAY DRIVING METHOD

RELATED APPLICATIONS

This application claims priority to China Application Serial Number 201210099644.1, filed Apr. 1, 2012, which is herein incorporated by reference.

BACKGROUND

1. Technical Field

The invention relates to a display technique. More particularly, the invention relates to a liquid crystal display panel and a display driving method.

2. Description of Related Art

The liquid crystal displayer is the most common digital display apparatus currently. Referring to FIG. 1, it shows a schematic diagram of a conventional liquid crystal display panel 100. As shown in FIG. 1, in the conventional liquid crystal display panel 100, each pixel unit 120 includes a driving switch 122, a storage capacitor $C_{ST}$ and a pixel capacitor $C_{LC}$. The driving switch 122 is controlled by a scan line G. When the scan line G enables the driving switch 122, a data voltage $V_{DATA}$ provided on a data line D is transferred to the storage capacitor $C_{ST}$ and the pixel capacitor $C_{LC}$ for storing. As shown in FIG. 2, the pixel voltage $V_{PIXEL}$ stored by the pixel capacitor $C_{LC}$ is derived from the data voltage $V_{DATA}$ provided by the data lines D.

In a conventional driving pattern, each of the storage capacitors $C_{ST}$ is mostly coupled to the same common electrode COM, and the common electrode COM supplies a constant DC voltage, which is referred to as DC common voltage driving. In the case that the common voltage is a constant DC voltage (such as at a constant voltage of 0 volt), in order to realize polarity inversion driving (a dot inversion, a column inversion driving, a row inversion or a frame inversion and the like) of pixels, the data voltage $V_{DATA}$ provided on the data lines D needs to be greatly changed between a positive voltage level and a negative voltage level (such as between +5 volts to −5 volts), which is power wasting and has a slow charging conversion speed.

Another conventional driving pattern provides an AC signal to the common electrode COM and switches positive and negative polarities of the common voltages (such as +5 volts and 0 volt) over time. Thus, the data voltage $V_{DATA}$ on the data lines D only needs to be changed between the levels such as 0 volt to +5 volts, such that a similar effect can be realized.

Thus, a variation range required by the data voltage $V_{DATA}$ on the data lines D can be reduced. The voltage variation range of the data signal $V_{DATA}$ has been reduced to a half of that under the DC driving when the common voltage uses the AC driving. However when it is applied in some portable products, limited by the battery durability of the portable products, the power consumption is still too large. Thus, it is expected to design a driving pattern in which the pixel voltage $V_{PIXEL}$ does not need to change completely depending on the data signal $V_{DATA}$, so as to reduce the total power consumption of the liquid crystal display panel 100.

A parasitic capacitor Ci also exists in the data line D and the common electrode COM corresponding to each of the pixel units, and the pixel units on one of the rows may be still subjected to signal interference from the pixel units on each of the other rows when they are not in their data writing period. For example, the data signals on the second row affect the common electrode COM on the first row through the parasitic capacitors Ci.

SUMMARY

An aspect of the invention provides a liquid crystal display panel. The liquid crystal display panel includes a plurality of data lines, a plurality of scan lines, a plurality of common electrode lines, a plurality of pixel units, a plurality of voltage buffer circuits and a plurality of common electrode controller units. The pixel units are coupled to the data lines and the scan lines. Each of the pixel units includes a storage capacitor. Each of the voltage buffer circuits includes an output end, a first input end, a second input end and a third input end. The output end of each of the voltage buffer circuits is coupled to one of the common electrode lines. The first input end of each of the voltage buffer circuits is coupled to a first common voltage source. The second input end of each of the voltage buffer circuits is coupled to a second common voltage source. Each of the common electrode controller units includes an output end, a first input end, a second input end and a third input end. The output end of each of the common electrode controller units is coupled to the third input end of one of the voltage buffer circuits. The first input end and the second input end of each of the common electrode controller units are respectively coupled to two adjacent scan lines. The third input end of each of the common electrode controller units is coupled to a common electrode controller signal source.

Another aspect of the invention provides a liquid crystal display panel. The liquid crystal display panel includes a plurality of data lines, a first scan line, a first common electrode line, a first row of pixels, a second scan line, a second common electrode line, a second row of pixels and a common electrode controller unit. The first row of pixels includes a plurality of first pixels. Each first pixel includes a first storage capacitor. Each first storage capacitor is coupled to the first common electrode line. Each first pixel is coupled to the first scan line and coupled to the corresponding data lines. The second row of pixels is adjacent to the first row of pixels, and includes a plurality of second pixels. Each second pixel includes a second storage capacitor. Each second storage capacitor is coupled to the second common electrode line. Each second pixel is coupled to the second scan line and coupled to the corresponding data lines. The common electrode controller unit includes a first switch and a second switch. The first switch has a first input end, a first output end and a first control end. The first control end is coupled to the first scan line. The first input end is coupled to a common electrode controller signal source. The first output end is coupled to the first common electrode line. The second switch has a second input end, a second output end and a second control end. The second control end is coupled to the second scan line. The second input end is coupled to the common electrode controller signal source. The second output end is coupled to the first common electrode line.

A further aspect of the invention provides a display driving method for a liquid crystal display panel. The liquid crystal display panel includes a plurality of data lines, a plurality of scan lines, a plurality of common electrode lines and a plurality of pixel units. The pixel units are coupled to the data lines and scan lines.

The display driving method includes: in response to the data writing period start of the pixel units on the $k^{th}$ row, enabling the scan lines on the $k^{th}$ row, supplying a first data voltage to the pixel units on the $k^{th}$ row with the data lines corresponding to the pixel units on the $k^{th}$ row; during the data writing period of the pixel units on the $k^{th}$ row, switching the $k^{th}$ common electrode line to a first reset potential; in response to termination of the data writing period of the pixel units on the $k^{th}$ row, disabling the scan lines on the $k^{th}$ row; in response to start of the data writing period of the pixel units on the $(k+1)^{th}$ row, enabling the scan lines on the $(k+1)^{th}$ row, and supplying a second data voltage to the pixel units on the $(k+1)^{th}$ row with the data lines corresponding to the pixel units on the $(k+1)^{th}$ row; during the data writing period of the pixel units on the $(k+1)^{th}$ row, switching the $(k+1)^{th}$ common electrode line to a second reset potential; during the data writing period of the pixel units on the $(k+1)^{th}$ row, switching the $k^{th}$ common electrode line from the first reset potential to an adjusting potential; after the data writing period of the pixel units on the $(k+1)^{th}$ row, maintaining the voltage level of the $k^{th}$ common electrode line at the adjusting potential; and, in response to termination of the data writing period of the pixel units on the $(k+1)^{th}$ row, disabling the scan lines on the $(k+1)^{th}$ row.

BRIEF DESCRIPTION OF THE DRAWINGS

In order to make the foregoing as well as other purposes, features, advantages and embodiments of the invention more apparent, the accompanying drawings are described as follows:

FIG. 8 shows a flow chart of a display driving method in an embodiment of the invention.

DETAILED DESCRIPTION

Figure 1:
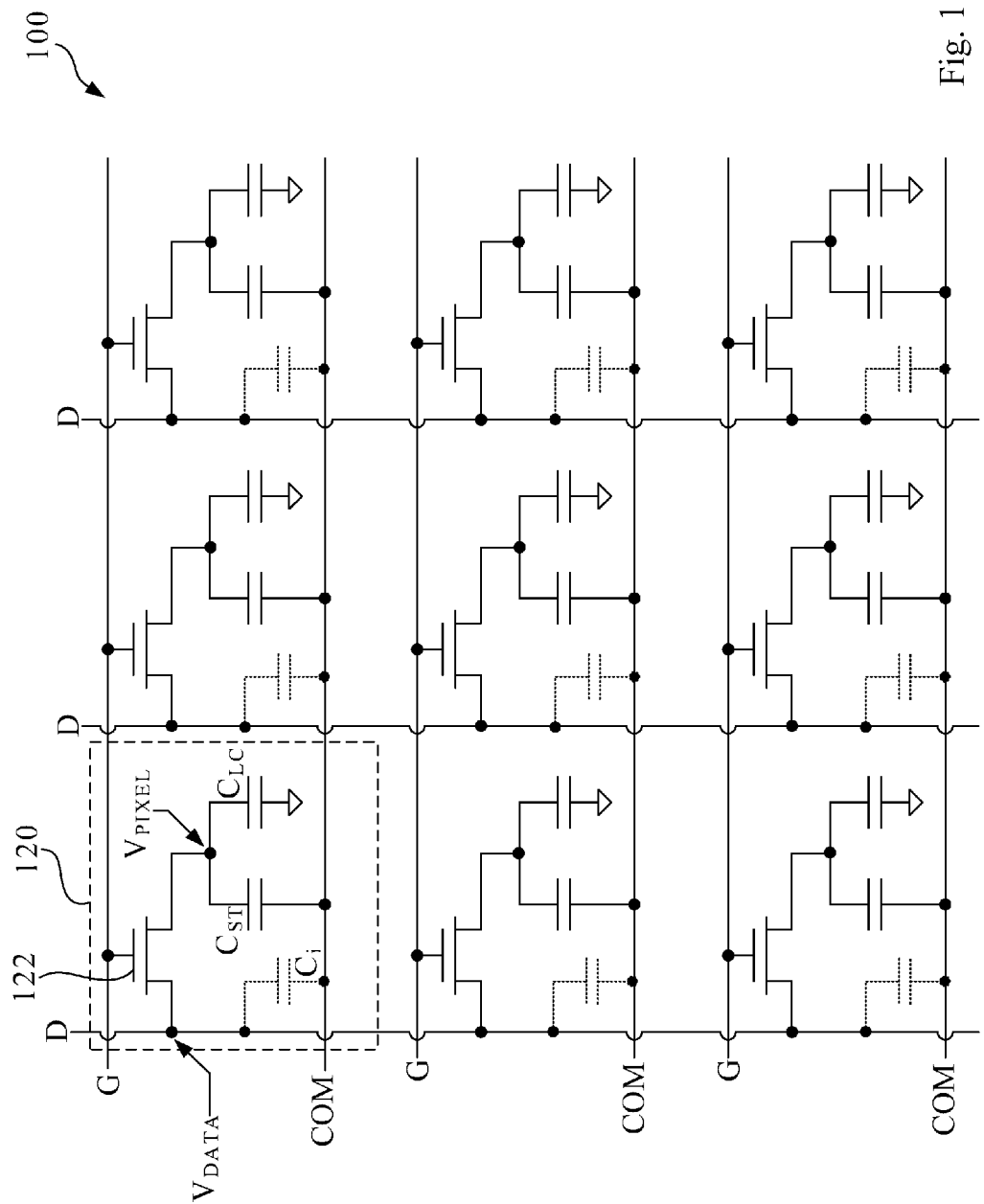
FIG. 1 shows a schematic diagram of a conventional liquid crystal display panel.

The invention is specially described through the following examples. Examples at anywhere throughout the specification, including the use of the example of any terms discussed here, are only illustrated as examples, and not intended to limit the scope or meaning of the invention or any exemplary term. For those skilled in the art, various variations and modifications can be made without departing from the spirit and scope of the invention. Therefore, the scope of the invention shall be defined by the appended claims. Furthermore, any embodiment or the claims of the invention are not necessary to reach the whole purposes, advantages or features disclosed in the invention. The abstract and title are only used for assisting in searching a patent document, and are not intended to limit the claims of the invention. When those skilled in the art implement an invention patent, it should be known that the invention patent and/or the components include the whole purposes, advantages or features that recited specifically, and also include other inherent functions, advantages or features of the invention patent that are not recited expressly. Thus, those skilled in the art can implement the invention patent and/or the components according to the teachings of the specification without limiting by the purposes, advantages or features that are recited specifically throughout the specification of the invention patent.

Throughout the specification and in the claims, "a", "an" and "the" mean that this kind of recitation includes "one or at least one" component or composition, unless expressly specified otherwise. That is, a singular article also means recitation of a plurality of components or compositions, unless a plural sense is excluded expressly in the context otherwise. Moreover, when it is applied in this description and the following claims, "in . . . " may include "in . . . " and "on . . . "", unless expressly specified otherwise. The terms used throughout the specification and the claims generally have a normal sense of each term that used in the field, in the disclosure and in the specific content, unless specifically noted. Some terms for describing the invention will be discussed below or elsewhere in this specification, to provide an additional guide concerning the description of the invention for practitioners. Additionally, it should be understood that, terms used here such as "comprising", "including", "having", "containing" and "involving" are open-ended, meaning including but not limited.

Terms such as "substantially", "around", "about" or "approximately" used here generally mean that the error is in a range of 20% of a given value or scope, and preferably in a range of 10%. A quantity provided here may be proximate, and thus means that the quantity can be expressed with "around", "about" or "approximately", unless specifically recited. When a quantity, a concentration or other values or parameters have a specified range, a preferred range or a table that lists the upper and lower ideal values, it should be considered that all ranges formed of number pairs or ideal values with any upper and lower limits are specifically disclosed, no matter whether these ranges are disclosed independently or not. For example, if a length H of a component is disclosed to be a range from X centimeters to Y centimeters, it should be considered that the length of the component is disclosed to be H and H can be selected as an arbitrary real number from X to Y.

Additionally, if the term of "electrically couple" or "electrically connect" is used, any directly or indirectly electrical connection means are included throughout the specification. For example, if it is described in the context that a first apparatus is electrically coupled to a second apparatus, it represents that the first apparatus is directly connected to the second apparatus or indirectly connected to the second apparatus through other apparatuses or connection means. Additionally, if a transmission or supply concerning an electric (magnetic) signal is described, those skilled in the art should understand that the transmission process of the electric signal may be accompanied with an attenuation or other non-ideal changes, but the electric signals at a source end or receiving end for the transmission or supply of the electric signal substantially should be considered as the same signal, unless specifically recited. For example, if an end point A of an electronic circuit transmits (or supplies) an electric signal S to an end point B of the electronic circuit, a voltage drop may be produced as a result of the signal passing through a source electrode and a drain electrode of a transistor switch and/or a possible stray impedance. However if a variation of the electric signal caused by the stray impedance and the transistor switch is not used for causing a specific technical effect but only non-ideal variations and these non-ideal variations substantially do not affect the operation of the electronic circuit, then the electric signal S at the end point A and end point B of the electronic circuit should be considered as the same signal. If a component defined with the function is appeared throughout the specification, it only means a performable function and/or predetermined function of the component, and is not intended to limit that the component must actuate continually to perform the performable function and/or predetermined function of the component.

The invention will be described in details in the following embodiments with reference to the accompanying drawings.

Figure 2:
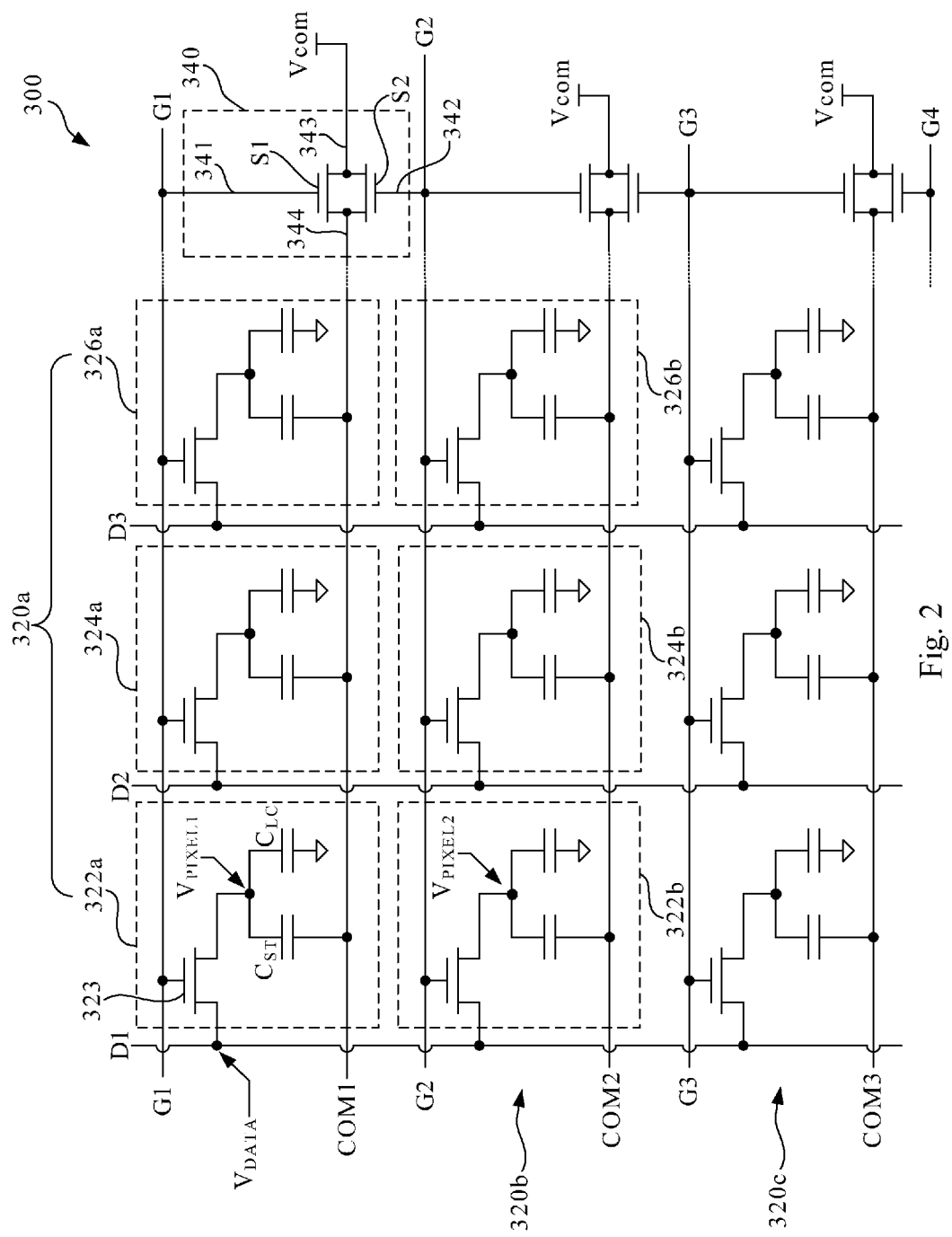
FIG. 2 shows a schematic diagram of a liquid crystal display panel according to an embodiment of the invention.

Referring to FIG. 2, it shows a schematic diagram of a liquid crystal display panel 300 according to an embodiment of the invention. As shown in FIG. 2, the liquid crystal display panel 300 includes a plurality of data lines (D1, D2, D3), a plurality of scan lines (G1, G2, G3, G4), a plurality of common electrode lines (COM1,COM2,COM3), a plurality of pixel units (322a, 324a, 326a, 322b, 324b, 326b) and a plurality of common electrode controller units 340. For purpose of convenience on illustration, the embodiment shown in FIG. 2 shows 3×3 pixel units schematically, but the invention is not limited to this.

In a practical application, the liquid crystal display panel 300 may include groups of pixel units with different numbers of column/row. The liquid crystal display panel 300 has the corresponding number of data lines, scan lines and common electrode lines. Those skilled in the art can deduce the corresponding number from this embodiment, which is not illustrated any more.

As shown in FIG. 2, each pixel unit includes a driving switch, a storage capacitor and a pixel capacitor, such as a driving switch 323, the storage capacitor $C_{ST}$ and the pixel capacitor $C_{CL}$ in the pixel unit 322a.

The pixel units are each coupled to the corresponding data lines and scan lines. Each of first pixels 320a located on the first row of the liquid crystal display panel 300, such as the pixel units 322a, 324a, 326a in FIG. 2, has a driving switches. The control ends of the driving switches in the pixels on the first row are coupled to the scan line G1 and coupled to the same corresponding common electrode line COM1. The above pixel units 322a, 324a, 326a are defined as pixel units on the same row.

The input ends of the driving switches of the pixel units 322a, 324a, 326a are each coupled to the corresponding data lines. For example, the pixel unit 322a is coupled to the data line D1, the pixel unit 324a is coupled to the data line D2, and the pixel unit 326a is coupled to the data line D3.

Furthermore, second pixels 320b located on the second row of the liquid crystal display panel 300, such as the pixel units 322b, 324b, 326b in FIG. 2, is adjacent to the pixel 320a. Each of the pixel units 322b, 324b, 326b also includes the driving switch, the storage capacitor and the pixel capacitor. The pixel 320b on the second row is coupled to the scan line G2, and coupled to the same corresponding common electrode line COM2. The internal structure of the second pixels 320b (the pixel units 322b, 324b, 326b) has a corresponding relationship with the first pixels 320a (the pixel units 322a, 324a, 326a), which is not illustrated any more.

In this embodiment, the liquid crystal display panel 300 includes plural common electrode controller units each corresponding to the pixel on each of the rows, such as the common electrode controller unit 340 in FIG. 2 corresponding to the pixel 320a.

The common electrode controller unit 340 includes an output end 344, a first input end 341, a second input end 342 and a third input end 343. The output end 344 of the common electrode controller unit 340 is coupled to the common electrode line COM1. The first input end 341 and the second input end 342 of the common electrode controller unit 340 are respectively coupled to the scan line G1 and the scan line G2 that are adjacent to each other. The third input end 343 of the common electrode controller unit 340 is coupled to a common electrode controller signal source Vcom. The common electrode controller signal source Vcom may be a alternative current voltage source.

In this embodiment, the common electrode controller unit 340 includes a first switch S1 and a second switch S2. The control end of the first switch S1 is coupled to the first input end 341 and the scan line G1. The input end of the first switch S1 is coupled to the third input end 343 and the common electrode controller signal source Vcom. The output end of the first switch S1 is coupled to the common electrode line COM1. The control end of the second switch S2 is coupled to the second input end 342 and the scan line G2. The input end of the second switch S2 is coupled to the third input end 343 and the common electrode controller signal source Vcom. The output end of the second switch S2 is coupled to the common electrode line COM1.

Figure 3A:
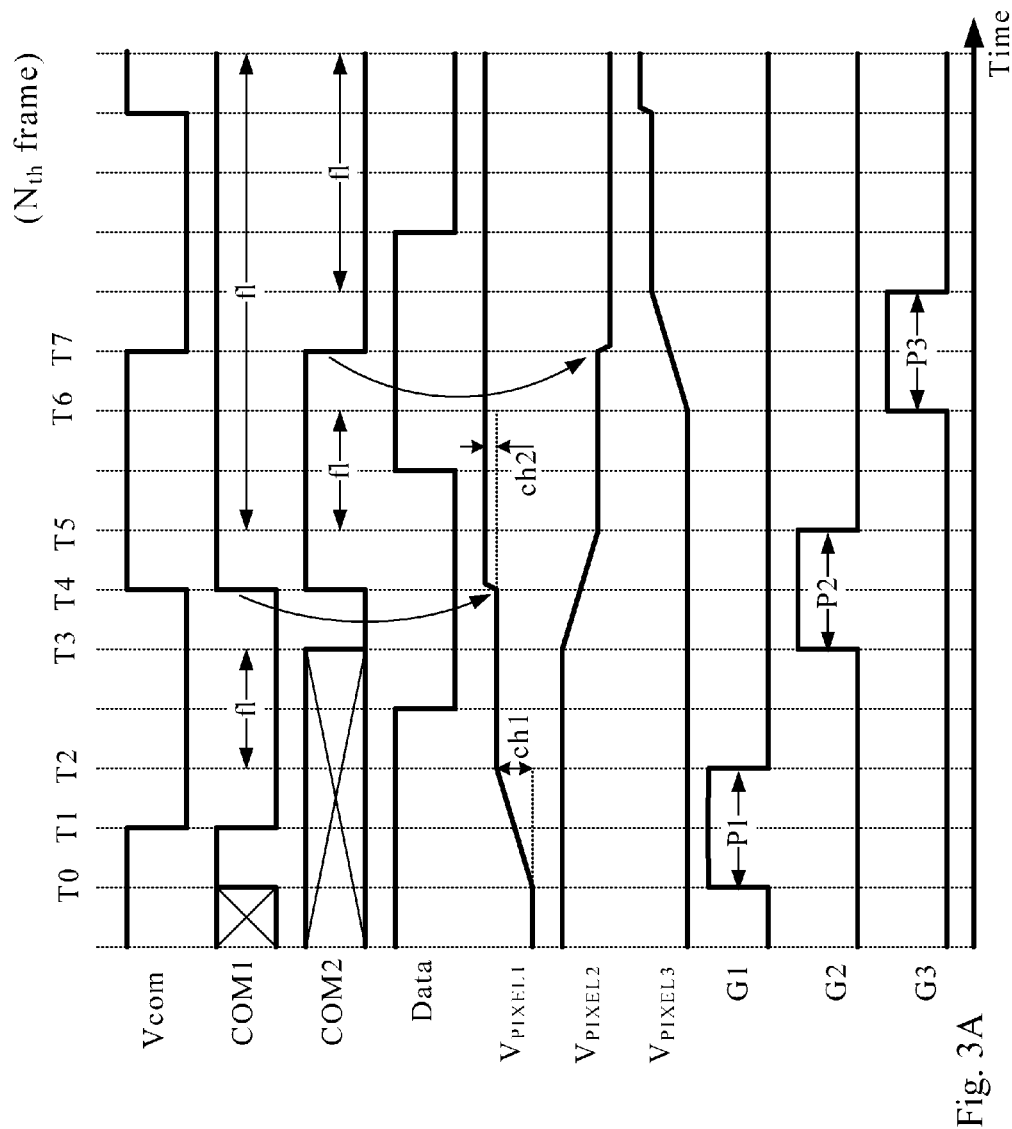
FIG. 3A shows a schematic diagram of an internal signal timing variation of the liquid crystal display panel in the embodiment of FIG. 2.

Referring to FIG. 3A at the same time, it shows a schematic diagram of an internal signal timing variation of the liquid crystal display panel 300 in the embodiment of FIG. 2. As shown in FIGS. 2 and 3A, the third input end 343 of the common electrode controller unit 340 is coupled to the common electrode controller signal source Vcom. In the embodiment of FIG. 3A, the control signal of the common electrode controller signal source Vcom is an AC signal alternately changing over time.

The common electrode controller unit 340 controls the voltage level of the common electrode line COM1 of the pixel 320a on the first row. In the common electrode controller unit 340, the first switch S1 and the second switch S2 are selectively turned on, so as to conduct the control signal of the common electrode controller signal source Vcom to the common electrode line COM1 of the pixel 320a on the first row. The first switch S1 actuates according to the scan line G1 corresponding to the pixel 320a on the first row, and the second switch S2 actuates according to another adjacent scan line G2.

As shown in FIG. 3A, from a time point T0, the data writing period of the first pixels (e.g., pixel units on the first row) is started, the scan line G1 is enabled, and the driving switch in each of the pixel units is turned on. The data lines (such as D1-D3 in FIG. 2) corresponding to the first pixels supply a first data voltage Data to the first pixels (such as 322a, 324a, 326a in FIG. 2), to and form a pixel voltage $V_{PIXEL1}$ which is stored in the pixel capacitor $C_{LC}$ of the first pixels.

As shown in FIG. 3A, from the time point T0 to a time point T2, i.e., a data writing period P1 of the first pixels, the first data voltage Data provided by the respective corresponding data lines is used for completing an initial charging ch1 to the first pixels.

During the data writing period P1, the first switch S1 of the common electrode controller unit 340 is turned on. The control signal of the common electrode controller signal source Vcom is conducted to the common electrode line COM1 of the pixel 320a on the first row. At a time point T1, the voltage level of the common electrode line COM1 is switched to the reset potential along with the control signal of the common electrode controller signal source Vcom.

After the time point T2, the data writing period P1 is over, and the driving switch in each of the first pixels and the first switch S1 are disabled.

Then, from a time point T3, the data writing period of the second pixels (e.g., pixel units on the second row) is started, and the scan line G2 is enabled. The driving switches in the second pixels (such as 322b, 324b, 326b in FIG. 2) are turned on. The data lines corresponding to the second pixels supply the second data voltage data (in this embodiment, the first and second data voltages may share the same data signal Data as shown in FIG. 3A, and the first and second data voltages can be sampled at different time periods on the data signal Data) to the second pixels, and form a pixel voltage $V_{PIXEL2}$ which is stored in the second pixels.

From the time point T3 to a time point T5, i.e., a data writing period P2 of the second pixels, the second data voltage data provided by the respective corresponding data lines is used for completing the initial charging to the second pixels. It should be noted that, in this embodiment, the charging polarity for initially charging the second pixels is from a high level to a low level. It should be specially illustrated that, during the data writing period P2 of the second pixels, at a time point T4 in this embodiment, the second switch S2 of the common electrode controller unit 340 is turned on. At this time, the control signal of the common electrode controller signal source Vcom is varied (from the low level to the high level), and the common electrode line COM1 is switched from the reset potential (the low level) to the adjusting potential (the high level).

Through a capacitor coupling effect of the storage capacitor $C_{ST}$ in each of the pixel units 322a, 324a, 326a, the pixel voltage $V_{PIXEL1}$ stored in the first pixels are correspondingly enhanced by the voltage variation (from the low level to the high level) of the above common electrode line COM1. That is, the common electrode line COM1 performs a recharging ch2 on the pixel units 322a, 324a, 326a on the first row through the storage capacitors $C_{ST}$ of the pixel units. It should be noted that, for each pixel unit, the charging polarities (from low to high) of the initial charging ch1 and the recharging ch2 are the same.

However, the invention is not only limited to the charging polarity from low to high. In the embodiment as shown in FIG. 3A, the charging polarity (including the initial charging and the recharging) of the second pixel units 322b, 324b, 326b (on the second row) is from high to low.

It should be supplemented that, at the time point T4, besides that the common electrode line COM1 on the first row is switched from the reset potential (the low level) to the adjusting potential (the high level), meanwhile the common electrode line COM2 on the next row (the second row) is switched to the reset potential (the high level) corresponding to the common electrode line COM2. That is, for the common electrode line COM1, the reset potential is the low level and the adjusting potential is the high level; and furthermore, for the common electrode line COM2, the reset potential is the high level and the adjusting level is the low level.

Then, during a data writing period P3 of the pixel units on the third row, the second common electrode line is switched from the reset potential (the high level) to the adjusting potential (the low level) for completing the recharging to the second pixel units 322b, 324b, 326b (e.g., pixel units on the second row).

Figure 3B:
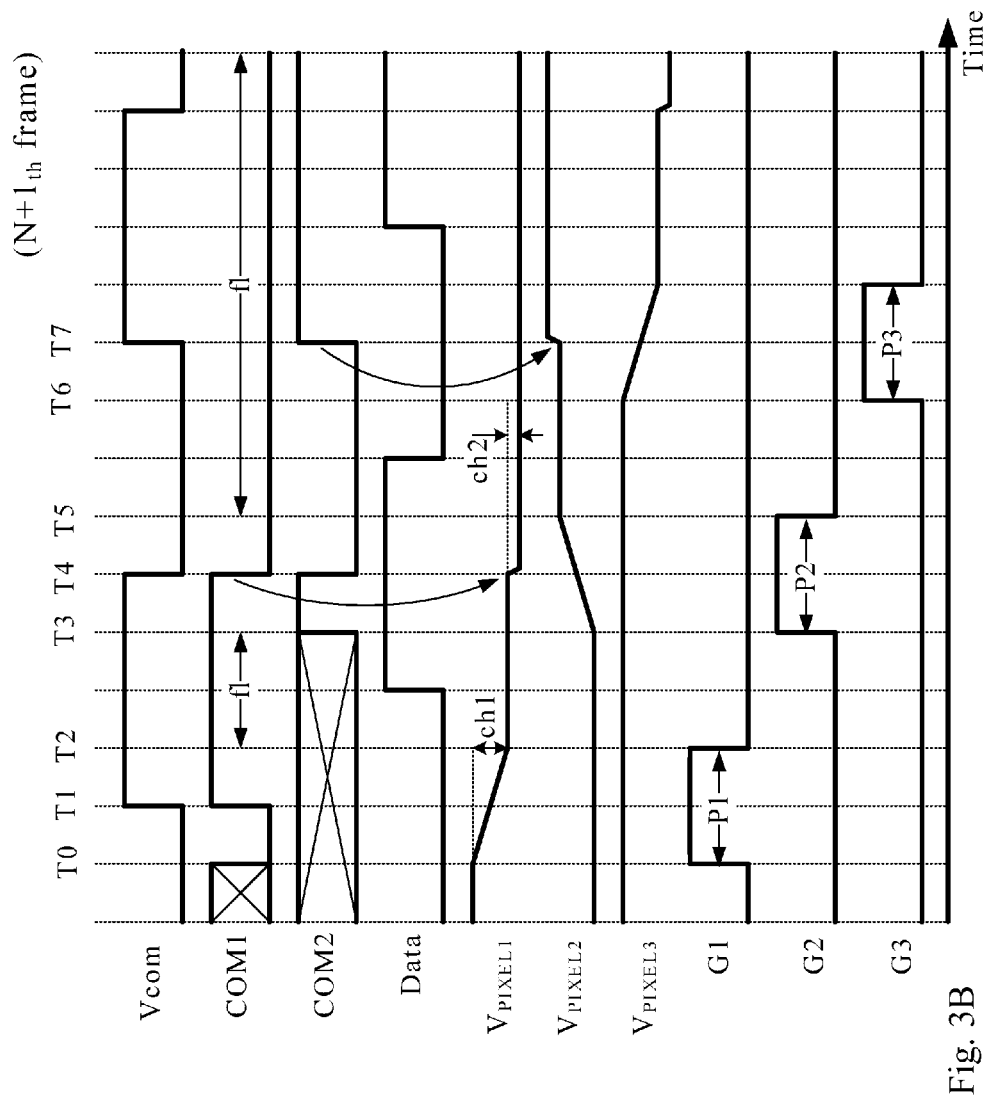
FIG. 3B shows a schematic diagram of an internal signal timing variation of the liquid crystal display panel in the embodiment of FIG. 2.

The timing waveform diagram of the embodiment shown in FIG. 3A may be a timing diagram of the $N^{th}$ frame in a practical application, and N is an arbitrary positive integer. In a practical application, under a specific driving pattern (such as the frame inversion driving), between different frames, the charging polarity of the driving circuit will be interchanged and inversed, so that a liquid crystal particle keeps a preferred characteristic. Referring to FIG. 3B at the same time, it shows a schematic diagram of the internal signal timing variation of the liquid crystal display panel 300. In this embodiment, the waveform shown in FIG. 3B is the timing diagram of the $(N+1)^{th}$ frame. The difference between FIGS. 3B and 3A is that, FIG. 3B shows the charging polarity after the frame is reversed, and its actuation substantially has a corresponding relationship with FIG. 3A, which is not illustrated any more.

Through the above common electrode controller unit 340, during the data writing period of the pixel units on one of the rows, the data voltage provided by the corresponding data lines is used for completing the initial charging to the pixel units on the row. Then, during the data writing period of the pixel units on another adjacent row, the common electrode controller unit controls the storage capacitor in the above pixel units on one of the rows for recharging the pixel units with the same charging polarity. Thus, the variation amplitude required by the data voltage and the power consumption can be reduced.

Based on aforesaid embodiment, the invention provides a liquid crystal display panel and a display driving method. In the invention, the liquid crystal display panel includes common electrode controller units. During the data writing period of the pixel units on one of the rows, a data voltage provided by a corresponding data line is used for completing an initial charging to the pixel units on the row. Then, during the data writing period of the pixel units on another adjacent row, the common electrode controller unit controls the storage capacitor of the above pixel units on one of the rows to recharge pixel units with the same charging polarity. Thus, the variation amplitude required by the data voltage and the power consumption can be reduced.

In the above embodiments of FIGS. 2, 3A and 3B, both the input end of the first switch S1 and the input end of the second switch S2 are coupled to the third input end 343 and the common electrode controller signal source Vcom, but the invention is not limited to this.

Figure 4:
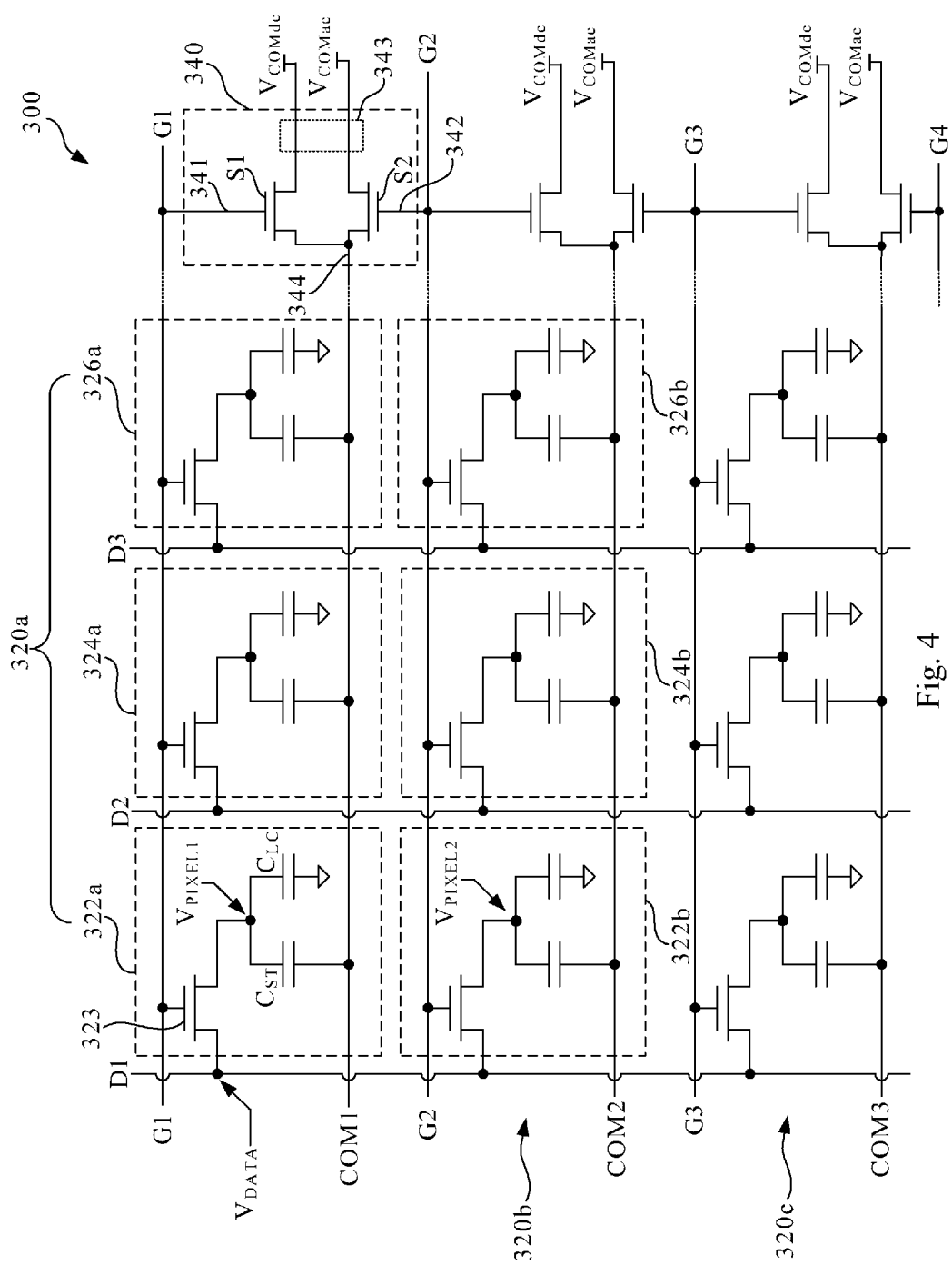
FIG. 4 shows a schematic diagram of a liquid crystal display panel according to another embodiment of the invention.
Figure 5A:
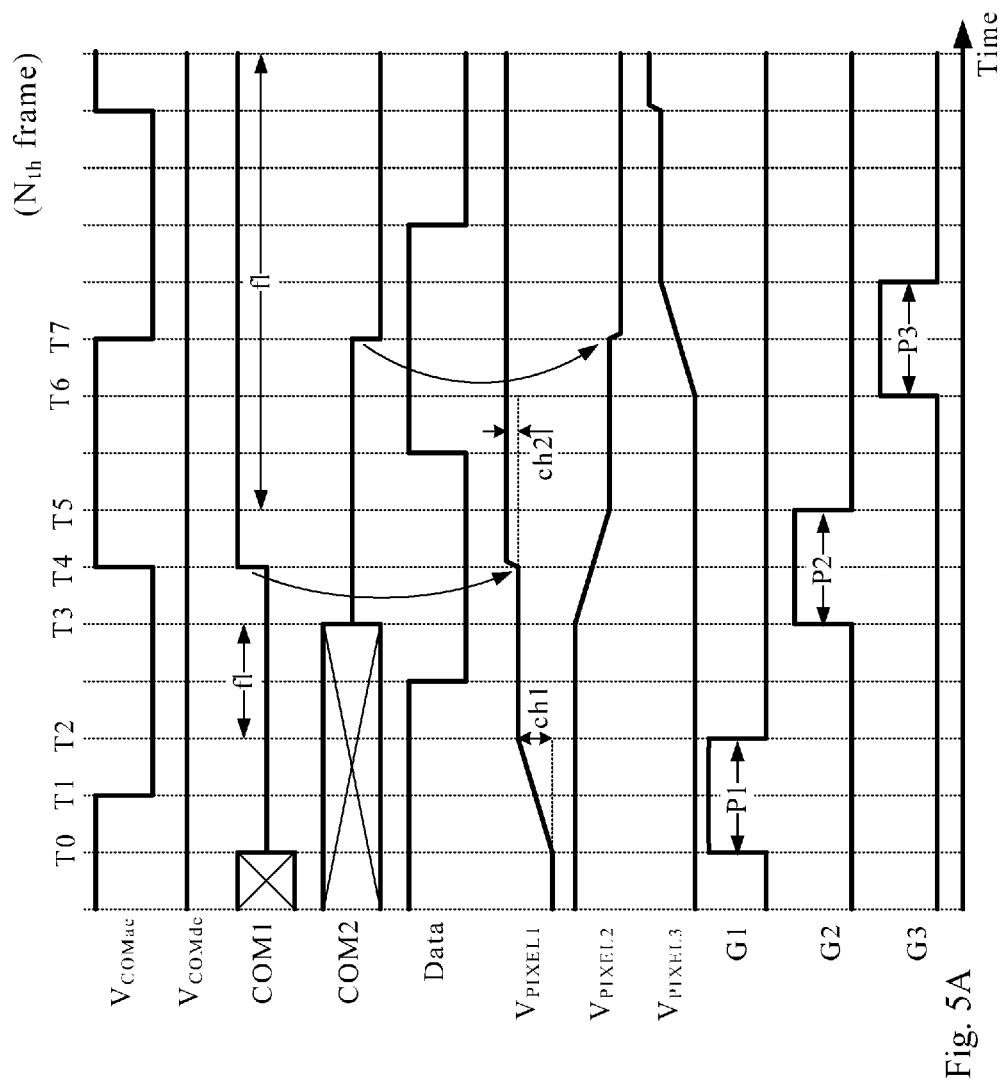
FIG. 5A shows a schematic diagram of an internal signal timing variation of the liquid crystal display panel in the embodiment of FIG. 4.
Figure 5B:
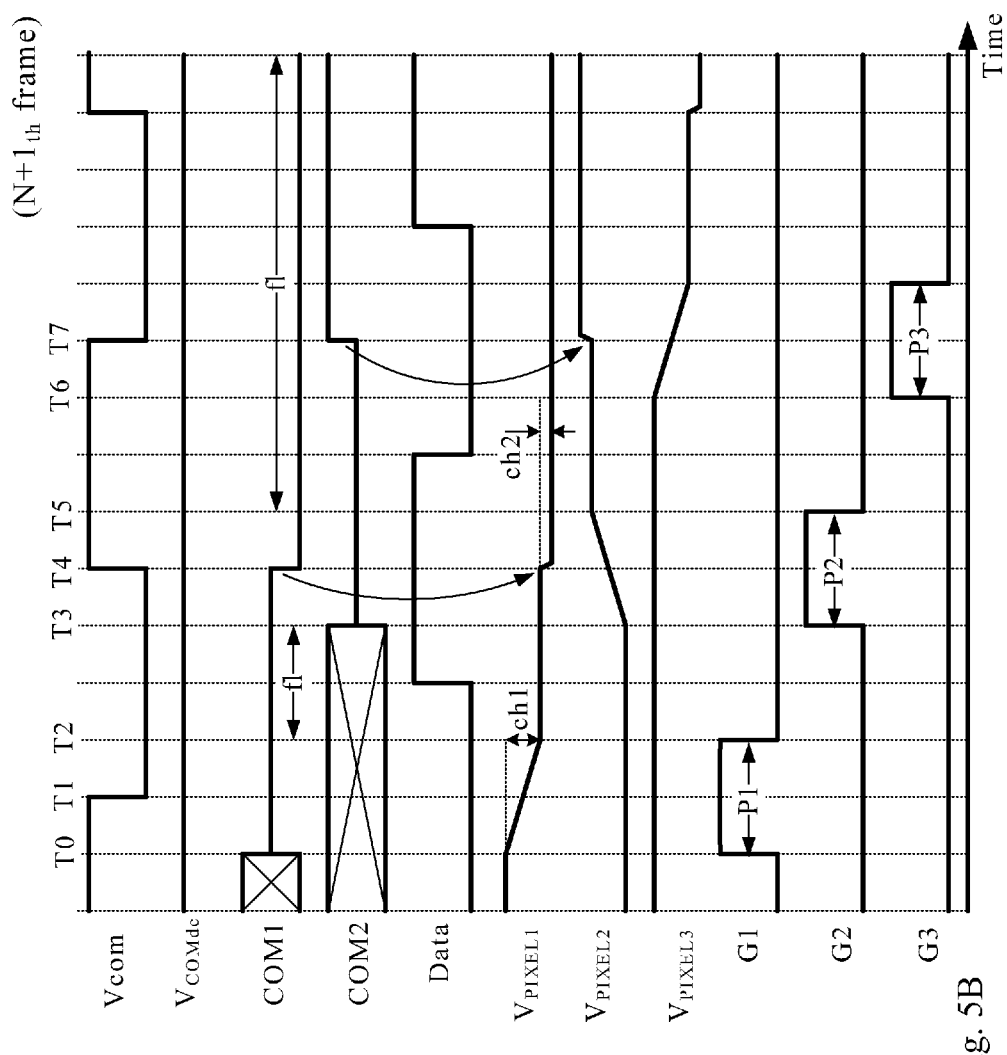
FIG. 5B shows a schematic diagram of an internal signal timing variation of the liquid crystal display panel in the embodiment of FIG. 4.

Referring to FIGS. 4, 5A and 5B, FIG. 4 shows a schematic diagram of a liquid crystal display panel 301 according to another embodiment of the invention. FIG. 5A shows a schematic diagram of the internal signal timing variation of the liquid crystal display panel 301 in the embodiment of FIG. 4. FIG. 5B shows a schematic diagram of the internal signal timing variation of the liquid crystal display panel 301 in the embodiment of FIG. 4.

The difference between the liquid crystal display panel 301 in FIG. 4 and the liquid crystal display panel 300 in the previous embodiments is that, the common electrode controller signal source coupled to the third input end 343 of the common electrode controller unit 340 is divided into two parts. As shown in FIG. 4, in the common electrode controller unit 340, the input end of the first switch S1 is coupled to an AC-powered common electrode controller signal source $V_{COMac}$ through the third input end 343. The input end of the second switch S2 is coupled to a DC-powered common electrode controller signal source $V_{COMdc}$ through the third input end 343.

As shown in FIGS. 5A and 5B, a voltage supplied by the AC-powered common electrode controller signal source $V_{COMac}$ substantially is the same as that of the common electrode controller signal source Vcom in the previous embodiments of FIGS. 3A and 3B, and the DC-powered common electrode controller signal source $V_{COMdc}$ substantially supplies a middle potential.

The difference between the embodiments in FIGS. 5A and 5B and FIGS. 3A and 3B is that, at the time point T0, the voltage level of the common electrode line COM1 is switched to the reset potential along with the turn-on of the first switch S1. At this time, the reset potential is the middle potential supplied by the DC-powered common electrode controller signal source $V_{COMdc}$.

It should be specially illustrated that, during the data writing period P2 of the second pixels (pixels on the second row), at the time point T4 in this embodiment, the second switch S2 of the common electrode controller unit 340 is turned on. At this time, the control signal of the AC-powered common electrode controller signal source $V_{COMac}$ is varied (from the low level to the high level), and the common electrode line COM1 is switched from the reset potential (the middle potential) to the adjusting potential (the high level).

Through the capacitor coupling effect of the first storage capacitor $C_{ST}$ in each of the first pixels (pixel units 322a, 324a, 326a), the pixel units 322a, 324a, 326a on the first row are recharged ch2 by the voltage variation (from the middle potential to the high level) of the above common electrode line COM1.

Additionally, other actuating patterns in detail in the embodiments of FIGS. 4, 5A and 5B substantially are similar to the embodiments in FIGS. 2, 3A and 3B, detailed descriptions in previous embodiments can be referred to.

However, a problem of floating potential exists on each of the common electrode lines in the above embodiments. Taking FIG. 3A as an example, for the pixel units 322a, 324a, 326a on the first row, outside the data writing period P1 and the data writing period P2 (such as, from the time point T2 to the time point T3 and after the time point T5), both the first switch S1 and the second switch S2 of the common electrode controller unit 340 are not turned on, so that the voltage level of the common electrode line COM1 is at the floating potential, such as a floating interval f1 marked in FIG. 3A. At this time, the voltage level of the common electrode line COM1 is easily subjected to the signal interference from the pixel units on each of the other rows. Similarly, as shown in FIG. 3A, the voltage level of the common electrode line COM2 is also at the floating interval f1 outside of the data writing periods P2 and P3. In practice, in FIGS. 3A, 3B, 5A and 5B, the voltage level of each common electrode line has the problem of floating potential.

Taking the embodiments in FIGS. 2 and 3A as examples, in practice, non-ideal parasitic capacitors exist between the data lines D1, D2, D3 corresponding to each of the pixel units and the common electrode lines COM1, COM2, COM3. When the first pixels are not in their data writing periods P1 and P2, the data signal interference from the pixel units on each of the other rows may still exist. For example, when the data signal on the third row is transferred at a time point T6, the common electrode line COM1 on the first row may be still affected through the parasitic capacitors.

Figure 6:
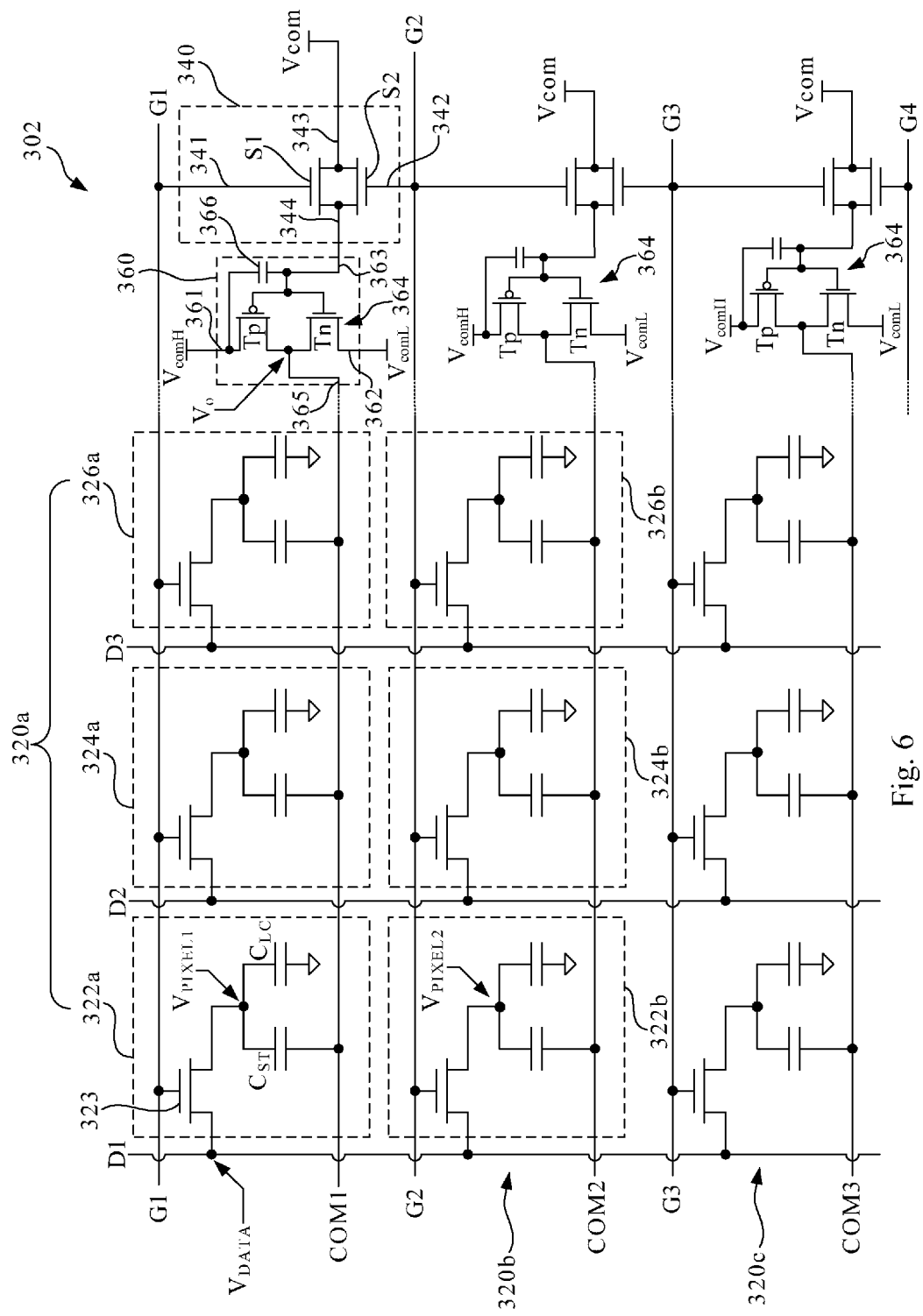
FIG. 6 shows a schematic diagram of a liquid crystal display panel according to a further embodiment of the invention.

Thus, the invention further discloses another embodiment. Referring to FIG. 6, it shows a schematic diagram of a liquid crystal display panel 302 according to another embodiment of the invention. The difference between the liquid crystal display panel 302 in this embodiment and the previous embodiments is mainly that, pixels on each rows (320a, 320b, 320c) in the liquid crystal display panel 302 further includes a voltage buffer circuit 360, which is coupled between the common electrode controller unit 340 and each of the common electrode lines COM1, COM2, COM3.

For purpose of convenience on illustration in FIG. 6, the voltage buffer circuit 360 located between the common electrode line COM1 of the first pixels 320a and the common electrode controller unit 340 is mainly taken as an example, but the voltage buffer circuit may be set on each of the pixels.

As shown in FIG. 6, the voltage buffer circuit 360 is coupled between the common electrode line COM1 and the common electrode controller unit 340. The output end of the voltage buffer circuit 360 is coupled to the common electrode line COM1. A first input end 361 of the voltage buffer circuit 360 is coupled to the first common voltage source (the high level common voltage source $V_{comH}$ in this embodiment). A second input end 362 of the voltage buffer circuit 360 is coupled to the second common voltage source (the low level common voltage source $V_{comL}$ in this embodiment). A third input end 363 of the voltage buffer circuit 360 is coupled to an output end 344 of the common electrode controller unit 340.

In this embodiment, the voltage buffer circuit 360 includes a complementary metal oxide semiconductor switch 364. The high voltage input end of the complementary metal oxide semiconductor switch 364 is coupled to the first input end 361 of the voltage buffer circuit 360 and the high level common voltage source $V_{comH}$. The low voltage input end of the complementary metal oxide semiconductor switch 364 is coupled to the second input end 362 of the voltage buffer circuit 360 and the low level common voltage source $V_{comL}$. The control end of the complementary metal oxide semiconductor switch 364 is coupled to the third input end 363 of the voltage buffer circuit and the output end 344 of the common electrode controller unit 340. The output end of the complementary metal oxide semiconductor switch 364 is coupled to the output end 365 of the voltage buffer circuit 360 and the common electrode line COM1.

The complementary metal oxide semiconductor switch 364 includes a P-type metal oxide semiconductor switch Tp and an N-type metal oxide semiconductor switch Tn. Gate electrodes of the P-type metal oxide semiconductor switch Tp and the N-type metal oxide semiconductor switch Tn are both coupled to the third input end 363 of the voltage buffer circuit and the output end 344 of the common electrode controller unit 340. The source electrode of the P-type metal oxide semiconductor switch Tp is coupled to the high level common voltage source $V_{comH}$. The drain electrode of the N-type metal oxide semiconductor switch Tn is coupled to the low level common voltage source $V_{comL}$. The drain electrode of the P-type metal oxide semiconductor switch Tp and the source electrode of the N-type metal oxide semiconductor switch Tn are both coupled to the output end 365 of the voltage buffer circuit 360 and the common electrode line COM1.

In this embodiment, the common electrode controller unit 340 controls the voltage level of the common electrode line COM1, and the voltage buffer circuit 360 maintains the voltage level of the common electrode line COM1, thereby avoiding the voltage level floating of the common electrode line COM1.

Additionally, the voltage buffer circuit 360 further includes a capacitor component 366. The capacitor component 366 is coupled to the control end (i.e., gate electrodes of the P-type metal oxide semiconductor switch Tp and the N-type metal oxide semiconductor switch Tn) of the complementary metal oxide semiconductor switch 364. The capacitor component 366 stores the input signal of the control end of the complementary metal oxide semiconductor switch 364 to keep the operation state of the voltage buffer circuit 360, thereby maintaining the voltage level of the common electrode line COM1.

Based on aforesaid embodiments, in order to avoid that the pixel units on one of the rows are subjected to the signal interference from the pixel units on each of the other rows when the pixel units on one of the rows are not in their data writing period, the liquid crystal display panel of the invention may further includes voltage buffer circuits. The voltage buffer circuits specify voltage levels of common electrode lines, thereby avoiding that the common electrode line of the pixel units on one of the rows is subjected to the signal interference from the pixel units on each of the other rows under a floating level In this embodiment, the output end and the input end of the complementary metal oxide semiconductor switch 364 are reverse logics. Those skilled in the art known that positive and negative logics of the input/output end signal in use may be correspondingly modified. Additionally, though each of the above voltage sources or control signals are not shown, skill members should know that, the signals or voltage sources (such as the common electrode controller signal source Vcom) can be provided by using for example a voltage generator or a power source generator, or by connecting to other end points having a corresponding voltage.

Figure 7A:
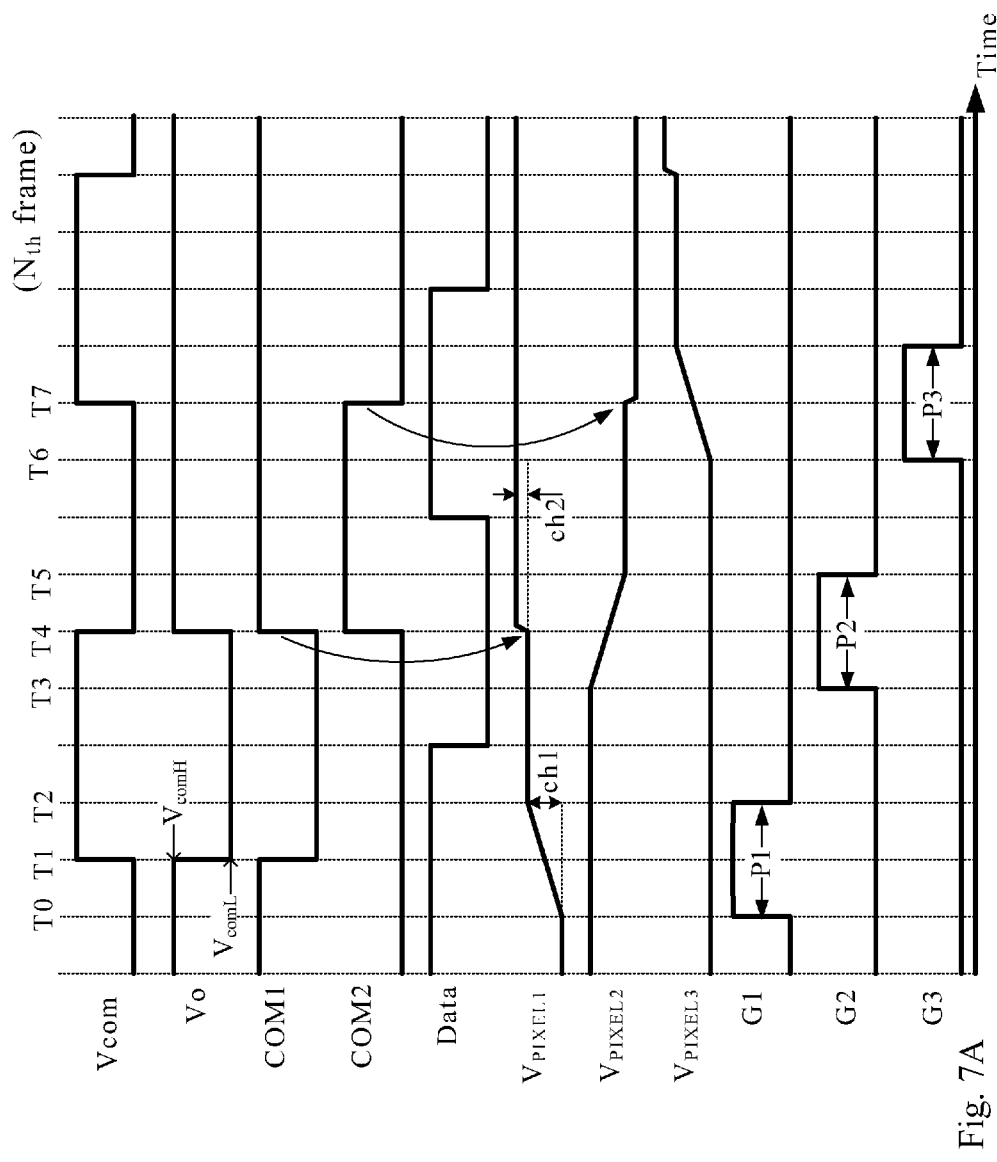
FIG. 7A shows a schematic diagram of an internal signal timing variation of the liquid crystal display panel in the embodiment of FIG. 6.

Referring to FIG. 7A at the same time, it shows a schematic diagram of the internal signal timing variation of the liquid crystal display panel 302 in the embodiment of FIG. 6. As shown in FIGS. 6 and 7A, the third input end 343 of the common electrode controller unit 340 is coupled to the common electrode controller signal source Vcom. In the embodiment of FIG. 7A, the control signal of the common electrode controller signal source Vcom is an AC signal alternatively changing over time.

From the time point T0, the data writing period of the first pixels is started, the scan line G1 is enabled, and the driving switch in each of the pixel units is turned on. The data lines (such as D1-D3 in FIG. 6) corresponding to the first pixels supply the data voltage Data to the first pixels (such as 322a, 324a, 326a in FIG. 6), and form the pixel voltage $V_{PIXEL1}$ which is stored in the pixel capacitors $C_{LC}$ of the first pixels.

As shown in FIG. 7A, from the time point T0 to the time point T2, i.e., the data writing period P1 of the first pixels, a buffer control voltage Vo generated at the output end of the voltage buffer circuit 360 is the reverse signal of the common electrode controller signal source Vcom.

As shown in FIG. 7A, from the time point T0 to the time point T2, i.e., the data writing period P1 of the first pixels, the data voltage Data supplied by the respective corresponding data lines is used for completing the initial charging ch1 to the first pixels.

During the data writing period P1, the first switch S1 of the common electrode controller unit 340 is turned on. The buffer control voltage Vo is conducted to the common electrode line COM1 of the pixel 320a on the first row. At the time point T1, the voltage level of the common electrode line COM1 is switched to the reset potential along with the buffer control voltage Vo.

After the time point T2, the data writing period P1 is over, and the driving switch in each of the first pixels and the first switch S1 are turned off.

Then, from the time point T3, the data writing period of the second pixels (e.g., pixel units on the second row) is started, and the scan line G2 is enabled. The driving switch in each of the second pixels (such as 322b, 324b, 326b in FIG. 2) is turned on. The data lines corresponding to the second pixels supply the data voltage Data to the second pixels, and form the pixel voltage $V_{PIXEL2}$ which is storied in the second pixels.

From the time point T3 to the time point T5, i.e., the data writing period P2 of the second pixels, the data voltage Data provided by the respective corresponding data lines is used for completing the initial charging to the second pixels. It should be noted that, in this embodiment, the charging polarity for initially charging the second pixels is from the high level to the low level.

It should be specially illustrated that, during the data writing period P2 (from the time point T3 to the time point T5) of the second pixels, at the time point T4 in this embodiment, the second switch S2 of the common electrode controller unit 340 is turned on. At this time, the buffer control voltage Vo is varied (from the low level to the high level), and the common electrode line COM1 is switched from the reset potential (the low level) to the adjusting potential (the high level).

Through the capacitor coupling effect of the storage capacitor $C_{ST}$ in each of the pixel units 322a, 324a, 326a, the pixel voltage $V_{PIXEL1}$ stored in the first pixels is correspondingly increased by the voltage variation (from the low level to the high level) of the above common electrode line COM1. That is, the common electrode line COM1 performs the recharging ch2 on the pixel units 322a, 324a, 326a on the first row through the storage capacitors $C_{ST}$ of the pixel units. It should be noted that, for each pixel unit, the charging polarities (from low to high) of the initial charging ch1 and the recharging ch2 are the same.

However the invention is not only limited to the charging polarity from low to high. In the embodiment as shown in FIG. 7A, the charging polarity (including the initial charging and the recharging) of the pixel units 322b, 324b, 326b on the second row is from high to low.

At the time point T4, besides that the common electrode line COM1 on the first row is switched from the reset potential (the low level) to the adjusting potential (the high level), meanwhile the common electrode line COM2 on the next row (the second row) is switched to the reset potential (the high level) corresponding to the common electrode line COM2.

Then, during the data writing period (not shown) of the pixel units on the third row, the second common electrode line is switched from the reset potential (the high level) to the adjusting potential (the low level) for recharging the pixel units 322b, 324b, 326b on the second row.

Through the above common electrode controller unit 340, during the data writing period of the pixel units on one of the rows, the data voltage provided by the corresponding data lines is used for completing the initial charging to the pixel units on the row. Then, during the data writing period of the pixel units on another adjacent row, the common electrode controller unit controls the storage capacitors of the above pixel units on one of the rows to recharge them with the same charging polarity. Thus, the variation amplitude required by the data voltage and the power consumption can be reduced.

Additionally, as shown in FIG. 7A, for the pixel units 322a, 324a, 326a on the first row, between the time points T2 to T3, the voltage buffer circuit 360 is used for maintaining the voltage level of the common electrode line COM1 at the reset potential (the low level), and after the time point T5, the voltage buffer circuit 360 is used for maintaining the voltage level of the common electrode line COM1 at the adjusting level (the high level). That is, outside of the data writing periods P1 and P2, the voltage buffer circuit 360 can be used for stabilizing the voltage level of the common electrode line COM1, thereby avoiding that the voltage level of the common electrode line COM1 is subjected to the signal interference from the pixel units on each of the other rows.

Figure 7B:
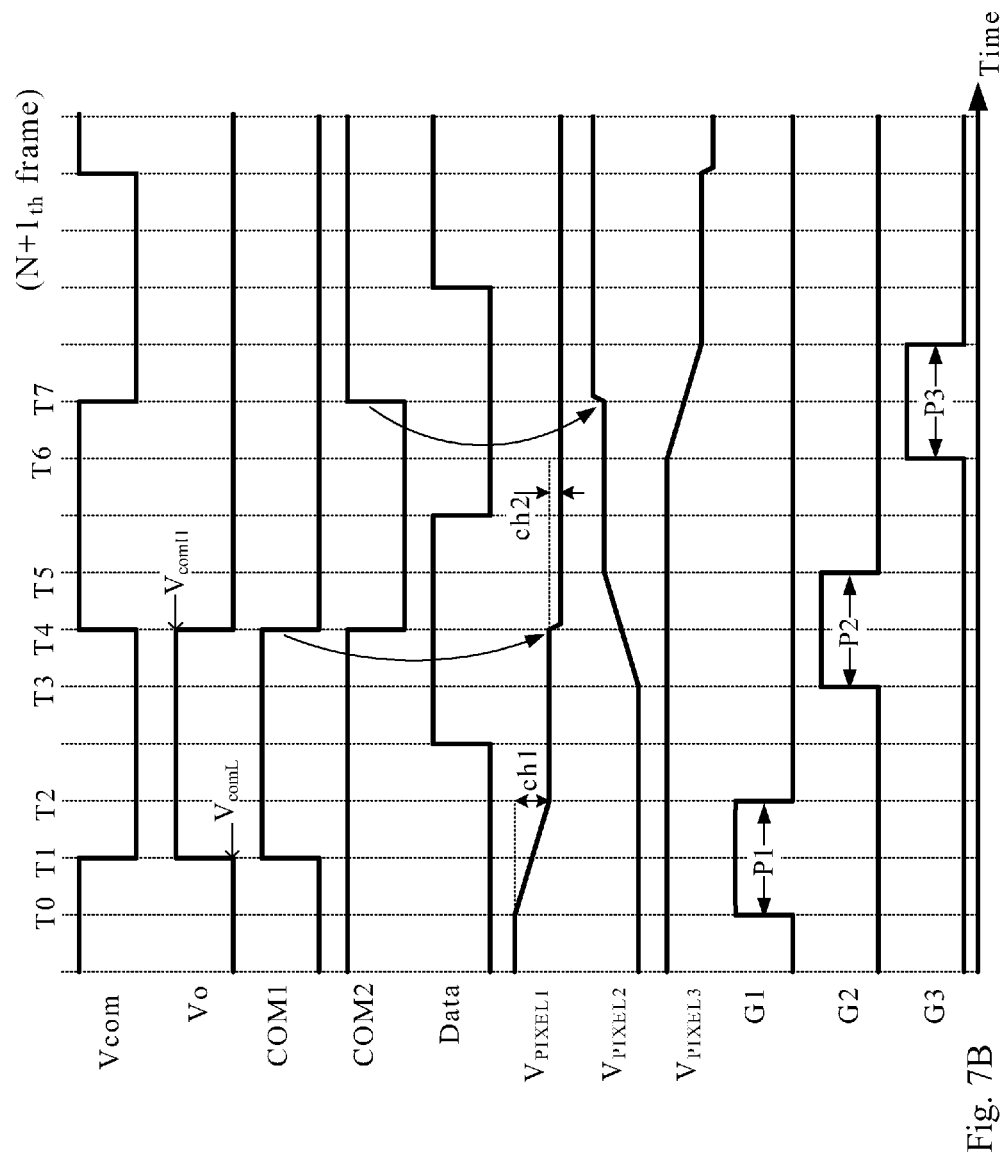
FIG. 7B shows a schematic diagram of an internal signal timing variation of the liquid crystal display panel in the embodiment of FIG. 6.

A timing diagram of the $N^{th}$ frame is shown in FIG. 7A, and N is an arbitrary positive integer. In a practical application, under a particular driving pattern (such as the frame inversion driving), between different frames, the charging polarity of the driving circuit is interchanged and inversed, so that the liquid crystal particle keeps the preferred characteristic. Additionally, the waveform shown in FIG. 7B is a timing diagram of the $(N+1)^{th}$ frame. The difference between FIG. 7A and FIG. 7B is that, FIG. 7B shows the charging polarity after the frame is inversed, and its actuation substantially has a corresponding relationship with FIG. 7A, which is not illustrated any more.

Additionally, the common electrode controller unit 340 shown in FIG. 6 uses the structure of the embodiment in FIG. 2. In practice, the structure of the common electrode controller unit 340 shown in the embodiment of FIG. 4 also can be used alternatively, and the invention is not limited to this.

Referring to FIG. 8 at the same time, it shows a method flowchart of a display driving method in an embodiment of the invention. The display driving method in this embodiment can be used with reference to the liquid crystal display panel 302 in the embodiments of FIGS. 6, 7A and 7B. The detailed actuation content and signal waveform of the display driving method can refer to FIGS. 6, 7A and 7B and the illustration on the embodiments thereof.

As shown in FIG. 8, in response to start of the data writing period of the pixel units on the $k^{th}$ row, the display driving method firstly performs the step S100 for enabling the scan line on the $k^{th}$ row is enabled. The data lines corresponding to the pixel units on the $k^{th}$ row supply a data voltage to the pixel units on the $k^{th}$ row, wherein, k is an arbitrary positive integer, and 1<k<the total number of rows of the pixel units on the liquid crystal display panel.

During the data writing period of the pixel units on the $k^{th}$ row, the step S102 is performed for switching the $k^{th}$ common electrode line to a first reset potential.

In response to termination of the data writing period of the pixel units on the $k^{th}$ row, the step S104 is performed for disabling the scan lines on the $k^{th}$ row.

During the data writing period of the pixel units on the $k^{th}$ row (from the step S100 to the step S104), the data voltage provided by the respective corresponding data lines is used for completing an initial charging to the pixel units on the $k^{th}$ row.

In response to start of the data writing period of the pixel units on the $(k+1)^{th}$ row, the step S106 is performed, enabling the scan lines on the $(k+1)^{th}$ row. The data lines corresponding to each of the pixel units on the $(k+1)^{th}$ row supply a data voltage to the pixel units on the $(k+1)^{th}$ row.

During the data writing period of the pixel units on the $(k+1)^{th}$ row, the step S108 is performed, switching the $(k+1)^{th}$ common electrode line to a second reset potential.

During the data writing period of the pixel units on the $(k+1)^{th}$ row, the step S110 is performed, switching The $k^{th}$ common electrode line from the first reset potential to an adjusting potential. At this time, the $k^{th}$ common electrode line recharges the pixel units on the $k^{th}$ row through a storage capacitor in each of the pixel units. For the pixel units on each row, the charging polarities of the initial charging and the recharging are the same.

In response to termination of the data writing period of the pixel units on the $(k+1)^{th}$ row, the step S112 is performed, disabling the scan line on the $(k+1)^{th}$ row.

After the data writing period of the pixel units on the $(k+1)^{th}$ row, the step S114 is performed, maintaining the voltage level of the $k^{th}$ common electrode line at the adjusting potential.

Additionally, it should be supplemented that, after the data writing period of the pixel units on the $k^{th}$ row (i.e., after the step S104), and before the data writing period of the pixel units on the $(k+1)^{th}$ row (before the step S106 is performed), the display driving method may further perform the step S105 for maintaining the voltage level of the kth common electrode line at the first reset potential.

In view of the above, the invention provides a liquid crystal display panel and a display driving method. The liquid crystal display panel in the invention includes the common electrode controller units to reduce the variation amplitude required by the data voltage and reduce the power consumption. Additionally, in order to avoid that the pixel units on one of the rows are subjected to signal interference from pixel units on each of the other rows when the pixel units on one of the rows are not in their data writing period, the liquid crystal display panel of the invention may further include the voltage buffer circuits. The voltage buffer circuits specify the voltage levels of the common electrode lines, thereby avoiding that the common electrode line of pixel units on one of the rows is subjected to the signal interference from pixel units on each of the other rows under the floating level.

Although the invention has been disclosed with reference to the above embodiments, these embodiments are not intended to limit the invention. It will be apparent to those of skills in the art that various modifications and variations can be made without departing from the spirit and scope of the invention. Thus, the scope of the invention should be defined by the appended claims.

What is claimed is:

1. A liquid crystal display panel, comprising:
   a plurality of data lines;
   a plurality of scan lines;
   a plurality of common electrode lines;
   a plurality of pixel units coupled to the data lines and the scan lines, wherein each of the pixel units comprises a storage capacitor;
   a plurality of voltage buffer circuits, wherein each of the voltage buffer circuits comprises an output end, a first input end, a second input end and a third input end, the output end of each voltage buffer circuit is coupled to one of the common electrode lines, the first input end of each voltage buffer circuit is coupled to a first common voltage source, and the second input end of each voltage buffer circuit is coupled to a second common voltage source; and
   a plurality of common electrode controller units, wherein each of the common electrode controller units comprises an output end, a first input end, a second input end and a third input end, the output end of each common electrode controller unit is coupled to the third input end of one of the voltage buffer circuits, the first input end and the second input end of each common electrode controller unit are respectively coupled to two adjacent scan lines, and the third input end of each common electrode controller unit is coupled to a common electrode controller signal source;
   wherein each voltage buffer circuit comprises a complementary metal oxide semiconductor switch and a capacitor component, the complementary metal oxide semiconductor switch comprises a high voltage input end, a low voltage input end, a control end and an output end, the high voltage input end of the complementary metal oxide semiconductor switch is coupled to the first input end of the voltage buffer circuit, the low voltage input end of the complementary metal oxide semiconductor switch is coupled to the second input end of the voltage buffer circuit, the control end of the complementary metal oxide semiconductor switch is coupled to the third input end of the voltage buffer circuit, and the output end of the complementary metal oxide semiconductor switch is coupled to the output end of the voltage buffer circuit, and the capacitor component is coupled to the control end of the complementary metal oxide semiconductor switch, and the capacitor component stores the input signal of the control end of the complementary metal oxide semiconductor switch to keep the operation state of the voltage buffer circuit, thereby maintaining a voltage level of the common electrode line.

2. The liquid crystal display panel of claim 1, wherein each common electrode controller unit comprises:
   a first switch comprises an input end, an output end and a control end, the control end of the first switch is coupled to the first input end of the common electrode controller unit, the input end of the first switch is coupled to the third input end of the common electrode controller unit, and the output end of the first switch is coupled to the output end of the common electrode controller unit; and
   a second switch comprises an input end, an output end and a control end, the control end of the second switch is coupled to the second input end of the to common electrode controller unit, the input end of the second switch is coupled to the third input end of the common electrode controller unit, and the output end of the second switch is coupled to the output end of the common electrode controller unit.

3. The liquid crystal display panel of claim 1, wherein
   each pixel unit further comprises a pixel capacitor, the pixel capacitors are all electrically connected to an identical common potential, and each of the pixel capacitors and each of the storage capacitors store a pixel voltage of each pixel unit.

4. The liquid crystal display panel of claim 3, wherein the pixel units coupled to the same scan line are coupled to the same corresponding common electrode line, and the pixel units coupled to the same scan line are defined as pixels on the same row.

5. The liquid crystal display panel of claim 1, wherein the pixel units coupled to the same scan line are coupled to the same corresponding common electrode line, and the pixel units coupled to the same scan line are defined as pixels on the same row.

6. A liquid crystal display panel, comprising:
   a plurality of data lines;
   a first scan line;
   a first common electrode line;
   a first row of pixels comprising a plurality of first pixels, wherein, each first pixel comprises a first driving switch and a first storage capacitor, wherein the first driving switch has an input end, an output end and a control end, and the input end of the first driving switch is coupled to one of the data lines, the output end of the first driving switch is coupled to the first storage capacitor, and the control end of the first driving switch is coupled to the first scan line, each of the first storage capacitor is coupled to the first common electrode line, the first storage capacitor has a first end and a second end, the first end of the first storage capacitor is coupled to the output end of the first driving switch and configured to receive a first data voltage through the first driving switch, the second end of the first storage capacitor is coupled to the first common electrode;
   a second scan line;
   a second common electrode line;
   a second row of pixels adjacent to the first row of pixels and comprising a plurality of second pixels, wherein, each second pixel comprises a second driving switch and a second storage capacitor, wherein the second driving switch has an input end, an output end and a control end, and the input end of the second driving switch is coupled to one of the data lines, the output end of the second driving switch is coupled to the second storage capacitor, and the control end of the second driving switch is coupled to the second scan line, and each of the second storage capacitor is coupled to the second common electrode line, the second storage capacitor has a first end and a second end, the first end of the second storage capacitor is coupled to the output end of the second driving switch and configured to receive a second data voltage through the second driving switch, the second end of the second storage capacitor is coupled to the second common electrode; and
   a common electrode controller unit, comprising:
   a first switch configured to control the voltage of the first common electrode line and having a first input end, a first output end and a first control end, wherein, the first control end is coupled to the first scan line, the first input end is coupled to a common electrode controller signal source, and the first output end is coupled to the first common electrode line; and
   a second switch configured to control the voltage of the first common electrode line and having a second input end, a second output end and a second control end, wherein, the second control end is coupled to the second scan line, the second input end is coupled to the common electrode controller signal source, and the second output end is coupled to the first common electrode line.

7. The liquid crystal display panel of claim 6, further comprising:
   a voltage buffer circuit comprising an output end, a first input end, a second input end and a third input end, wherein, the output end of the voltage buffer circuit is coupled to the first common electrode line, the first input end of the voltage buffer circuit is coupled to a first common voltage source, the second input end of the voltage buffer circuit is coupled to a second common voltage source, and the third input end of the voltage buffer circuit is coupled to the first output end of the first switch and the second output end of the second switch;
   wherein, the first output end of the first switch and the second output end of the second switch are electrically coupled to the first common electrode line through the voltage buffer circuit.

8. The liquid crystal display panel of claim 7, wherein the voltage buffer circuit comprises a complementary metal oxide semiconductor switch, the complementary metal oxide semiconductor switch comprises a high voltage input end, a low voltage input end, a control end and an output end, the high voltage input end of the complementary metal oxide semiconductor switch is coupled to the first input end of the voltage buffer circuit, the low voltage input end of the complementary metal oxide semiconductor switch is coupled to the second input end of the voltage buffer circuit, the control end of the complementary metal oxide semiconductor switch is coupled to the third input to end of the voltage buffer circuit, and the output end of the complementary metal oxide semiconductor switch is coupled to the output end of the voltage buffer circuit; and
   the voltage buffer circuit further comprises a capacitor component, the capacitor component is coupled to the control end of the complementary metal oxide semiconductor switch, and the capacitor component stores the input signal of the control end of the complementary metal oxide semiconductor switch to keep the operation state of the voltage buffer circuit, thereby maintaining a voltage level of the common electrode line.

9. A display driving method for a liquid crystal display panel, wherein, the liquid crystal display panel comprises a plurality of data lines, a plurality of scan lines, a plurality of common electrode lines and a plurality of pixel units, the plurality of pixel units are coupled to the data lines and scan lines, and the display driving method comprises:
   in response to start of a data writing period of the pixel units of a $k^{th}$ row, enabling the scan lines on the $k^{th}$ row, and supplying a first data voltage to the pixel units of the $k^{th}$ row with the data lines corresponding to the pixel units of the $k^{th}$ row;
   during the data writing period of the pixel units on the $k^{th}$ row, switching the $k^{th}$ common electrode line to a first reset potential;
   in response to termination of the data writing period of the pixel units of the $k^{th}$ row, disabling the scan lines on the $k^{th}$ row;
   in response to start of a data writing period of the pixel units of a $(k+1)^{th}$ row, enabling the scan lines on the $(k+1)^{th}$ row, and supplying a second data voltage to the pixel units of the $(k+1)^{th}$ row with the data lines corresponding to the pixel units of the $(k+1)^{th}$ row;
   during the data writing period of the pixel units on the $(k+1)^{th}$ row, switching the $(k+1)^{th}$ common electrode line to a second reset potential;
   during the data writing period of the pixel units on the $(k+1)^{th}$ row, switching the $k^{th}$ common electrode line from the first reset potential to an adjusting potential, wherein the scan lines on the $k^{th}$ row are disabled and a driving switch controlled by the scan lines on the $k^{th}$ row is disable when the $k^{th}$ common electrode line is switched from the first reset potential to the adjusting potential;
   after the data writing period of the pixel units on the $(k+1)^{th}$ row, maintaining the voltage level of the $k^{th}$ common electrode line at the adjusting potential; and
   in response to termination of the data writing period of the pixel units of the $(k+1)^{th}$ row, disabling the scan lines of the $(k+1)^{th}$ row.

10. The display driving method of claim 9, further comprising:
   during the data writing period of the pixel units of the $k^{th}$ row, completing an initial charging to the first data voltage of the pixel units of the $k^{th}$ row with the corresponding data lines; and
   during the data writing period of the pixel units of the $(k+1)^{th}$ row, in response to the $k^{th}$ common electrode line switched from the first reset potential to the adjusting potential, recharging the pixel units of the $k^{th}$ row with the $k^{th}$ common electrode line through a storage capacitor of each pixel unit of the $k^{th}$ row.

11. The display driving method of claim 10, wherein the charging polarities of the initial charging and the recharging are the same.

12. The display driving method of claim 10, further comprising:
   after the data writing period of the pixel units on the $k^{th}$ row, and before the data writing period of the pixel units on the $(k+1)^{th}$ row, maintaining the voltage level of the $k^{th}$ common electrode line at the first reset potential.

* * * * *